United States Patent
Trapp et al.

(10) Patent No.: US 8,756,123 B2
(45) Date of Patent: Jun. 17, 2014

(54) INVENTORY VERIFICATION USING INVENTORY SNAPSHOTS

(75) Inventors: Roland Trapp, Speyer (DE); Matthias Asal, Walldorf (DE); Wolfgang Barheine, Bruchsal (DE); Achim Heger, Vallis (SE); Christopher Thiele, Nussloch (DE)

(73) Assignee: SAP AG, Walldorf (DE)

( * ) Notice: Subject to any disclaimer, the term of this patent is extended or adjusted under 35 U.S.C. 154(b) by 462 days.

(21) Appl. No.: 12/964,741

(22) Filed: Dec. 10, 2010

(65) Prior Publication Data

US 2012/0150699 A1   Jun. 14, 2012

(51) Int. Cl.
*G06Q 10/00* (2012.01)

(52) U.S. Cl.
USPC .......................................................... 705/28

(58) Field of Classification Search
USPC .......................................................... 705/28
See application file for complete search history.

(56) References Cited

U.S. PATENT DOCUMENTS

| | | | |
|---|---|---|---|
| 7,383,284 B2 | 6/2008 | Heinrichs et al. | |
| 7,664,684 B2 | 2/2010 | Boerner et al. | |
| 2002/0133387 A1* | 9/2002 | Wilson et al. | 705/8 |
| 2003/0187714 A1* | 10/2003 | Perry et al. | 705/10 |
| 2003/0208417 A1 | 11/2003 | Heinrichs et al. | |
| 2006/0085294 A1 | 4/2006 | Boerner et al. | |
| 2006/0152370 A1* | 7/2006 | Vishik et al. | 340/572.1 |
| 2008/0027835 A1* | 1/2008 | LeMasters et al. | 705/28 |
| 2008/0120200 A1* | 5/2008 | Hurtis et al. | 705/28 |
| 2008/0228879 A1* | 9/2008 | Cardone et al. | 709/205 |
| 2010/0010666 A1* | 1/2010 | Adams | 700/231 |
| 2010/0088197 A1* | 4/2010 | Dehaan et al. | 705/28 |
| 2010/0262521 A1* | 10/2010 | Robinson et al. | 705/29 |
| 2010/0268616 A1* | 10/2010 | Tisi et al. | 705/22 |
| 2011/0066897 A1* | 3/2011 | Bumgarner et al. | 714/46 |

* cited by examiner

*Primary Examiner* — Seye Iwarere

(57) ABSTRACT

Various embodiments of systems and methods for inventory verification using inventory snapshots are described herein. In response to a first inventory posting in a current time period, a current open inventory snapshot is created with inventory information. If there is a previously open inventory snapshot that is created in a previous time period before the current period, then the previously open inventory snapshot is closed. To verify inventory for a past time period, a difference between an inventory snapshot that is valid for the past time period and an inventory snapshot that is valid for a time period previous to the past time period is compared with aggregated inventory change confirmations posted in the past time period. An error indicator is provided if there is a mismatch between the difference and the aggregated inventory change confirmations.

21 Claims, 18 Drawing Sheets

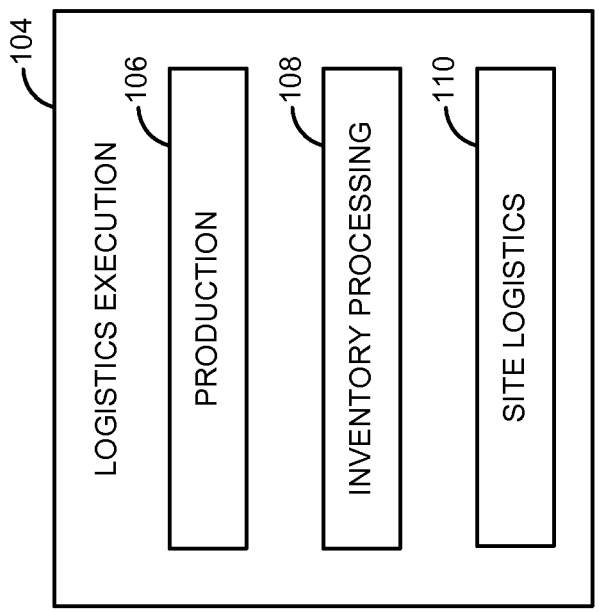
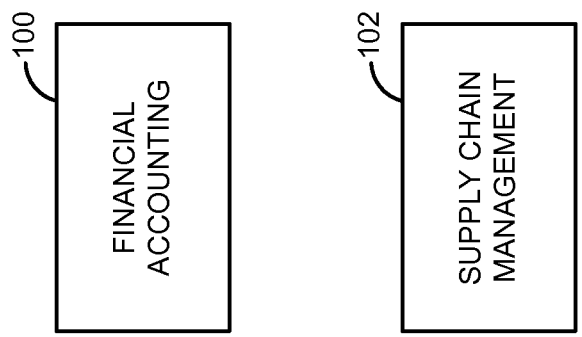
FIG. 1

| /LIME/SN_HEADER | | | | |
|---|---|---|---|---|
| FEILD | DATA ELEMENT | DATA TYPE | LENGTH | DESCRIPTION |
| MANDT | MANDT | CLNT | 3 | CLIENT |
| GUID_SN | /LIME/GUID | RAW | 16 | LIME GUID FOR HUs, LOCATIONS OR STOCKS ITEMS |
| TS_SNAPSHOT | /LIME/TIMESTAMP_SN | DEC | 21 | LIME TIMESTAMP FOR SNAPSHOTS |
| CHECKED_IN | /LIME/SN_CHECKED_IND | CHAR | 1 | SNAPSHOT CHECKED INDICATOR |
| ERROR_IND | /LIME/SN_ERROR_IND | CHAR | 1 | INDICATES A SNAPSHOT ERROR |
| INV_COUNT | | INT4 | 10 | NATURAL NUMBER |
| INV_COMPLETE | CHAR1 | CHAR | 1 | SINGLE-CHARACTER FLAG |
| INV_COUNT2 | | INT4 | 10 | NATURAL NUMBER |
| INV_COMPLETE2 | CHAR1 | CHAR | 1 | SINGLE-CHARACTER FLAG |
| GAC_COUNT | | INT4 | 10 | NATURAL NUMBER |
| GAC_COMPLETE | CHAR1 | CHAR | 1 | SINGLE-CHARACTER FLAG |
| SLC_COUNT | | INT4 | 10 | NATURAL NUMBER |
| SLC_COMPLETE | CHAR1 | CHAR | 1 | SINGLE-CHARACTER FLAG |
| PEC_COUNT | | INT4 | 10 | NATURAL NUMBER |
| PEC_COMPLETE | CHAR1 | CHAR | 1 | SINGLE-CHARACTER FLAG |
| CREA_DATE_TIME | /LIME/TIMESTAMP_INT | DEC | 21 | LIME INTERNAL TIME STAMP (YYYYMMDD, HHMMSS,MM MUUUN |
| CREA_IDENT_UUID | /LIME/GUID | RAW | 16 | LIME GUID FOR HUs, LOCATIONS OR STOCKS ITEMS |
| LCHG_DATE_TIME | /LIME/TIMESTAMP_INT | DEC | 21 | LIME INTERNAL TIME STAMP (YYYYMMDD, HHMMSS,MM MUUUN |
| LCHG_IDENT_UUID | /LIME/GUID | RAW | 16 | LIME GUID FOR HUs, LOCATIONS OR STOCKS ITEMS |

FIG. 8

| /LIME/SN_NTREE | | | | |
|---|---|---|---|---|
| FEILD | DATA ELEMENT | DATA TYPE | LENGTH | DESCRIPTION |
| MANDT | MANDT | CLNT | 3 | CLIENT |
| GUID | /LIME/GUID | RAW | 16 | LIME GUID FOR HUs, LOCATIONS OR STOCK ITEMS |
| TS_SNAPSHOT | /LIME/TIMESTAMP_SN | DEC | 21 | LIME TIMESTAMP FOR SNAPSHOTS |
| OVERFLOW | /LIME/OVERFLOW | INT4 | 10 | OVERFLOW ID FOR TREE NODES |
| TS_PERIOD_START | /LIME/TIMESTAMP_SN | DEC | 21 | LIME TIMESTAMP FOR SNAPSHOTS |
| TYPE | /LIME/OBJECT_TYPE | CHAR | 1 | OBJECT TYPE |
| IDX | /LIME/KEY_INDEX | CHAR | 3 | CURRENT NUMBER OF KEY TABLE |
| GUID_PARENT | /LIME/GUID_PARENT | RAW | 16 | PARENT GUID |
| TYPE_PARENT | /LIME/OBJECT_TYPE | CHAR | 1 | OBJECT TYPE |
| IDX_PARENT | /LIME/KEY_INDEX | CHAR | 3 | CURRENT NUMBER OF KEY TABLE |
| LFT | /LIME/TREE_INTERVAL | DEC | 31 | WIDTH OF NODE IN LIME TREE |
| RGT | /LIME/TREE_INTERVAL | DEC | 31 | WIDTH OF NODE IN LIME TREE |
| LVL | /LIME/TREE_LEVEL | INT4 | 10 | LEVEL IN TREE HIERARCHY OBSERVED FROM LEAF |
| GAP | /LIME/TREE_INTERVAL | DEC | 31 | WIDTH OF NODE IN LIME TREE |
| GUID_PN_ADD | /LIME/GUID_PN | RAW | 16 | LIME GUID FOR PRIMA NOTA |
| ID_ADD | /LIME/LINE_ITEM_ID | NUMC | 6 | ITEM |
| TARGET_ADD | /LIME/TARGET | CHAR | 1 | DESCRIBES WHETHER IT IS SOURCE OR TARGET DATA RECORD |
| TS_LIME_ADD | /LIME/TIMESTAMP_INT | DEC | 21 | LIME IINTERNALTIME STAMP (YYYYMMDDhhmmss,mmmuuun) |
| LU_QUANTITY | /LIME/QUANTITY | DF34_DEC | 31 | STOCK QUANTITY |
| LU_UNIT | /LIME/UNIT | CHAR | 3 | STOCK UNIT OF MEASURE |
| EMPTY_QUANTITY | /LIME/QUANTITY | DF34_DEC | 31 | STOCK QUANTITY |
| GUID_SN | /LIME/GUID | RAW | 16 | LIME GUID FOR HUs, LOCATIONS OR STOCK ITEMS |
| AGG_CONF_LU_QUAN | /LIME/QUANTITY | DF34_DEC | 31 | STOCK QUANTITY |
| SN_CHECKED_IND | /LIME/SN_CHECKED_IND | CHAR | 1 | SNAPSHOT CHECKED INDICATOR |
| SN_ERROR_IND | /LIME/SN_ERROR_IND | CHAR | 1 | INDICATES A SNAPSHOT ERROR |

FIG. 9

| /LIME/SN_NQUAN | | | | |
|---|---|---|---|---|
| FIELD | DATA ELEMENT | DATA TYPE | LENGTH | DESCRIPTION |
| MANDT | MANDT | CLNT | 3 | CLIENT |
| GUID_STOCK | /LIME/GUID_STOCK | RAW | 16 | GUID STOCK ITEM |
| GUID_PARENT | /LIME/GUID_PARENT | RAW | 16 | PARENT GUID |
| VSI | /LIME/VSI | CHAR | 1 | VIRTUAL STOCK INDICATOR |
| UNIT | /LIME/UNIT | CHAR | 3 | STOCK UNIT OF MEASURE |
| TS_SNAPSHOT | /LIME/TIMESTAMP_SN | DEC | 21 | LIME TIMESTAMP FOR SNAPSHOTS |
| TS_PERIOD_START | /LIME/TIMESTAMP_SN | DEC | 21 | LIME TIMESTAMP FOR SNAPSHOTS |
| QUAN | /LIME/QUANTITY | DF34 DEC | 31 | STOCK QUANTITY |
| AGG_CONF_QUAN | /LIME/QUANTITY | DF34 DEC | 31 | STOCK QUANTITY |
| SN_CHECKED_IND | /LIME/SN_CHECKED_IND | CHAR | 1 | SNAPSHOT CHECKED INDICATOR |
| SN_ERROR_IND | /LIME/SN_ERROR_IND | CHAR | 1 | IINDICATES A SNAPSHOT ERROR |
| LFT | /LIME/TREE_INTERVAL | DEC | 31 | WIDTH OF NODE IN LIME TREE |
| LVL | /LIME/TREE_LEVEL | INT4 | 10 | LEVEL IN TREE HIERARCHY OBSERVED FROM LEAF |
| IDX_STOCK | /LIME/KEY_INDEX | CHAR | 3 | CURRENT NUMBER OF KEY TABLE |
| TYPE_PARENT | /LIME/OBJECT_TYPE | CHAR | 1 | OBJECT TYPE |
| IDX_PARENT | /LIME/KEY_INDEX | CHAR | 3 | CURRENT NUMBER OF KEY TABLE |
| INV_BLOCK_IND | /LIME/INV_BLOCK_IND | CHAR | 1 | BLOCKING INDICATOR FOR PHYSICAL INVENTORY COUNT |
| TS_LAST_ABS_POST | /LIME/TIMESTAMP_EXT | DEC | 21 | UTC TIME STAMP (YYYYMMDDhhmmss,mmmuuun) |
| TS_LAST_ADD_POST | /LIME/TIMESTAMP_EXT | DEC | 21 | UTC TIME STAMP (YYYYMMDDhhmmss,mmmuuun) |
| TS_LAST_SUB_POST | /LIME/TIMESTAMP_EXT | DEC | 21 | UTC TIME STAMP (YYYYMMDDhhmmss,mmmuuun) |
| TS_LAST_PI_COUNT | /LIME/TIMESTAMP_EXT | DEC | 21 | UTC TIME STAMP (YYYYMMDDhhmmss,mmmuuun) |

FIG. 10

/LIME/SN_LSQ

| FIELD | DATA ELEMENT | DATA TYPE | LENGTH | DESCRIPTION |
|---|---|---|---|---|
| MANDT | MANDT | CLNT | 3 | CLIENT |
| GUID_STOCK | /LIME/GUID_STOCK | RAW | 16 | GUID STOCK ITEM |
| GUID_PARENT | /LIME/GUID_PARENT | RAW | 16 | PARENT GUID |
| TS_SNAPSHOT | /LIME/TIMESTAMP_SN | DEC | 21 | LIME TIMESTAMP FOR SNAPSHOTS |
| TS_PERIOD_START | /LIME/TIMESTAMP_SN | DEC | 21 | LIME TIMESTAMP FOR SNAPSHOTS |
| GUID_LSQ | /LIME/GUID_LSQ | RAW | 16 | GUID LSQ |
| .INCLUDE | /LIME/LSQ_ATTRIB | STRU | 0 | LSQ ATTRIBUTES |
| INV_BLOCK_IND | /LIME/INV_BLOCK_IND | CHAR | 1 | BLOCKING INDICATOR FOR PHYSICAL INVENTORY COUNT |
| GUID_SN | /LIME/GUID | RAW | 16 | LIME GUID FOR HUs, LOCATIONS OR STOCK ITEMS |

FIG. 11

| /LIME/SN_NQUAN | | |
|---|---|---|
| TS PERIOD_START | TS SNAPSHOT | QUAN |
| 01.06.2009 | 31.12.9999 | 10 |

| /LIME/SN_LSQ | | |
|---|---|---|
| TS PERIOD_START | TS SNAPSHOT | GUID_SN |
| 01.06.2009 | 31.12.9999 | GUID1 |

FIG. 15

| /LIME/SN_NQUAN | | |
|---|---|---|
| TS PERIOD_START | TS SNAPSHOT | QUAN |
| 01.06.2009 | 31.12.9999 | 20 |

FIG. 16

/LIME/SN_NQUAN

| TS PERIOD_START | TS SNAPSHOT | QUAN |
|---|---|---|
| 01.06.2009 | 01.07.2009 | 20 |
| 01.07.2009 | 31.12.9999 | 30 |

/LIME/SN_LSQ

| TS PERIOD_START | TS SNAPSHOT | GUID_SN |
|---|---|---|
| 01.06.2009 | 01.07.2009 | GUID1 |
| 01.07.2009 | 31.12.9999 | GUID2 |

FIG. 17

/LIME/SN_NQUAN

| TS PERIOD_START | TS SNAPSHOT | QUAN | AGG_CONF_QUAN | CHECKED | ERROR |
|---|---|---|---|---|---|
| 01.06.2009 | 01.07.2009 | 20 | 20 | X | |
| 01.07.2009 | 31.12.9999 | 30 | | | |

FIG. 18

| /LIME/SN_NQUAN | | | | | |
|---|---|---|---|---|---|
| TS PERIOD_START | TS SNAPSHOT | QUAN | AGG_CONF_QUAN | CHECKED | ERROR |
| 01.06.2009 | 01.07.2009 | 20 | 20 | X | |
| 01.07.2009 | 01.08.2009 | 30 | 32 | X | X |
| 01.08.2009 | 31.12.9999 | 40 | | | |

FIG. 19

| /LIME/SN_NQUAN | | | | | |
|---|---|---|---|---|---|
| TS PERIOD_START | TS SNAPSHOT | QUAN | AGG_CONF_LU_QUAN | CHECKED | ERROR |
| 01.06.2009 | 01.07.2009 | 20 | 20 | X | |
| 01.07.2009 | 01.08.2009 | 32 | 32 | X | |
| 01.08.2009 | 31.12.9999 | 42 | | | |

FIG. 20

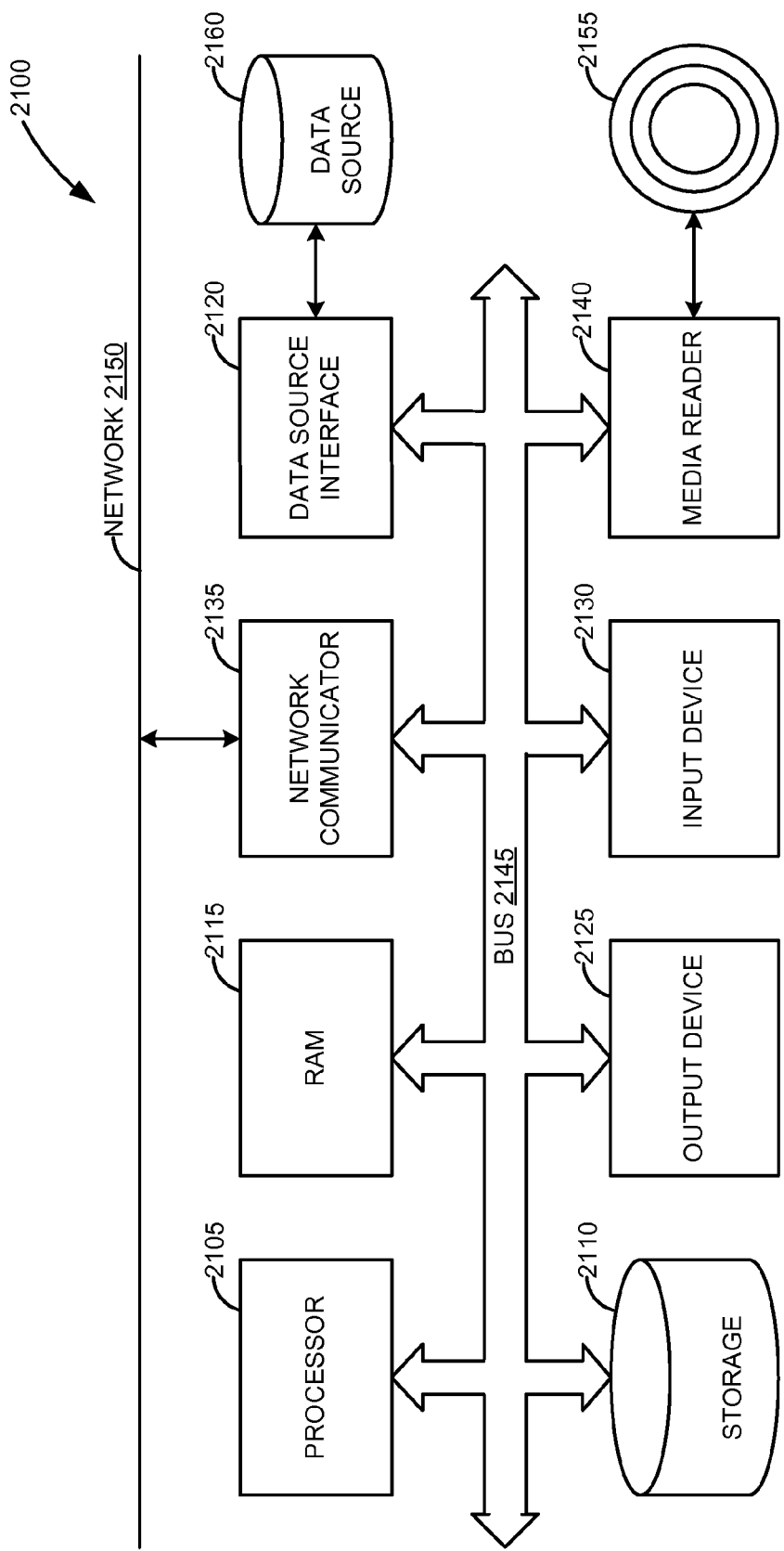

INVENTORY VERIFICATION USING INVENTORY SNAPSHOTS

FIELD

The field relates generally to inventory management systems. More particularly, the field is related to inventory verification methods.

BACKGROUND

Inventory management has become part of almost every type of industry. A proper inventory management system provides several benefits and reduces costs by constantly monitoring inventory levels. An optimum range of inventory can be maintained to reduce storage or warehousing costs while meeting the needs of customers and avoiding any shortage. Inventory data can be used to identify items that fall short or predicted to fall short and these items can then be procured through finance and procurement channels of an organization. Inventory data may also be needed for various organizational functions such as finance and procurement.

Inventory related information is needed for organizational functions such as supply chain management and financial accounting. There can be different views of inventory in different functions. Inventory views can include, for example, current inventory amount stored in supply chain management system and current inventory amount stored in financial accounting for the valuation of the materials. Because of different views of inventory, inventory data is redundantly available and can be inconsistent. But to fulfill various requirements such as legal compliance requirements, there is a need to verify the consistency between the inventory data stored in the different inventory views. However, there can be numerous inventory related entries even for a shorter time period. Verifying the inventory for any given period can therefore be cumbersome and error prone.

It would therefore be desirable to provide an inventory verification method to verify inventory data in an enterprise system.

SUMMARY

Various embodiments of systems and methods for inventory verification using inventory snapshots are described herein. In response to a first inventory posting in a current time period, a current open inventory snapshot is created with inventory information. The inventory information comprises inventory quantity. If there is a previously open inventory snapshot that is created in a previous time period before the current period, then the previously open inventory snapshot is closed. To verify inventory for a past time period, a difference between an inventory snapshot that is valid for the past time period and an inventory snapshot that is valid for a time period previous to the past time period is compared with aggregated inventory change confirmations posted in the past time period. An error indicator is provided if there is a mismatch between the difference and the aggregated inventory change confirmations.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 1 is a block diagram illustrating organizational functions that use inventory information, according to one embodiment.

FIG. 8 is a block diagram showing an exemplary database table for storing inventory snapshot headers, according to one embodiment.

FIGS. 9-11 are block diagrams showing exemplary database tables for storing inventory information of inventory snapshots, according to one embodiment.

FIG. 15 is a block diagram showing entries that are created in database tables in response to a first inventory posting in a first time period, according to one embodiment.

FIG. 16 is a block diagram showing an entry created in a database table in response to a second inventory posting in a first time period, according to one embodiment.

FIG. 17 is a block diagram showing an entry created in a database table in response to a first inventory posting in a second time period, according to one embodiment.

FIG. 18 is a block diagram showing an exemplary entry created in a database table for verifying the inventory, according to one embodiment.

FIG. 19 is a block diagram showing another exemplary entry created in a database table for verifying the inventory, according to one embodiment.

FIG. 20 is a block diagram showing an entry created in a database table after correcting a mismatch, according to another embodiment.

FIG. 21 is a block diagram of an exemplary computer system according to one embodiment.

DETAILED DESCRIPTION

Figure 2:
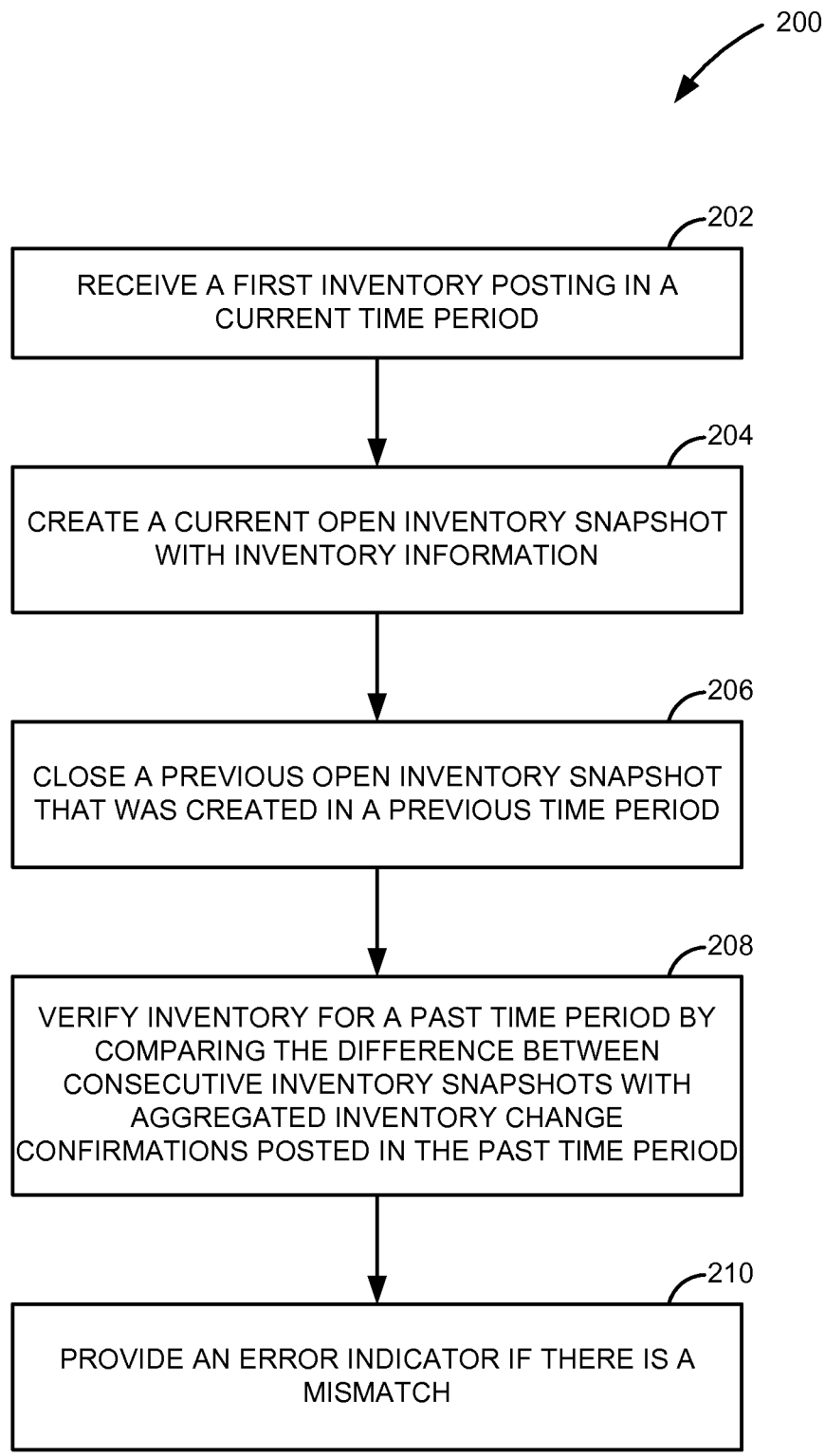
FIG. 2 is a block diagram illustrating a method for inventory verification, according to one embodiment.

Embodiments of techniques for inventory verification using inventory snapshots are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Referring to FIG. 1, inventory information is used in important organizational functions such as financial accounting 100, supply chain management 102, and logistics execution 104. Each of these functions can have an associated software system. For example, a financial accounting system 100 can be used to perform various tasks in financial accounting. A supply chain management system 102 can be used to plan and manage supply chain processes. A logistic execution system 104 is a type of inventory management system that is used to control and organize movement of inventory. Movement of inventory can include outbound processing of sending materials to customers, inbound processing of receiving materials from vendors, and transportation of material. The logistic execution system 104 can have process components such as production component 106, inventory processing component 108, and site logistics processing component 110.

If a current inventory is changed, a document called inventory change confirmation is created. The inventory change confirmation is created to clearly document changes made at points in time, a person who made the changes, and for which logistics process the changes are made. The inventory change confirmations are persisted independently of the inventory. Inventory change confirmations are created during warehouse and production operation and are used for financial accounting. Inventory change documents are stored in logistics execution system 104. Inventory change documents record any change in inventory quantity and location.

FIG. 2 is a block diagram of a method 200 for inventory verification. Inventory postings are made in an inventory management system such as a logistics execution system 104. The inventory postings mainly include inventory-change activity that is entered in an inventory management system. For example, inventory postings may include goods movement posting, goods issue posting, and goods receipt posting.

According to the method 200, inventory snapshots are created for inventory postings in relation to time periods that can be predefined. The time periods can be defined by a user or can follow a system or process-specific time periods such as weekly or monthly periods. Time periods follow one after the other and are delimited by time points. For example, monthly periods are delimited by the time points at 00:00 of the first day of each month. The end time of a given period is the start time of the next period. Therefore, a monthly period is from the beginning of the first day of a given month until the end of the last day of that month. In response to a first inventory posting in a current time period 202, a current open inventory snapshot is created at 204 as a copy of the corresponding inventory that has been updated. The start time of the current period is assigned as a start date or start time for the current open inventory snapshot. In addition to the quantity of inventory, location of the inventory in a warehouse can also be included in the current open inventory snapshot. Therefore, the current open inventory snapshot includes a quantity of inventory and location of that particular inventory.

The current open inventory snapshot is valid from the start time of the current period. In response to any subsequent inventory postings in the current time period subsequent to the first inventory posting, the current open inventory snapshot is updated with inventory quantity each time an inventory posting takes place. Therefore the current open inventory snapshot is in sync with inventory. Consider the time period is a monthly time period and the inventory quantity is zero. For a first inventory posting of inventory quantity 'x' in a month, a current open inventory snapshot is created with inventory quantity 'x'. If there is a second inventory posting of inventory quantity 'y' at a later date in the same month, the current open inventory snapshot is updated with inventory quantity 'y.' Therefore, the inventory quantity in the current open inventory snapshot will be 'x+y.' If the inventory quantity is 'p' prior to the first inventory posting, a current open inventory snapshot is created with inventory quantity 'p+x'. For the second inventory posting of inventory quantity 'y' at a later date in the same month, the current open inventory snapshot is updated with inventory quantity 'y' and the inventory quantity in the current open inventory snapshot will be 'p+x+y.'

For previous time periods, there can be inventory snapshots that are created according to the procedure described above except if the current time period is the first time period for creating inventory snapshots. If there is no previous open inventory snapshot, then a new inventory snapshot with quantity zero is created and closed as will be explained in reference to FIG. 4. At 206, if there is a previously open inventory snapshot that is created in a previous time period before the current period, the previously open inventory snapshot is closed in response to the first inventory posting in the current time period. When closing the previous open inventory snapshot, the end time of the previous time period is assigned as a closing time or closing date for the previous open inventory snapshot. The start time of the current open inventory snapshot will be the start time of the current time period. Therefore, each closed inventory snapshot includes a start/opening time and a closing time Consider the current time period is in March and the previous time period is in February. For an inventory posting in February, an open inventory snapshot will be created that is valid from the beginning of February. If a next inventory posting happens in March, a new inventory snapshot will be created that is valid from the beginning of March. The previous open inventory snapshot, i.e. the inventory snapshot valid from the beginning of February, will be closed by the end of February. The February inventory snapshot is therefore valid from the beginning of the February till the end of the February. If another inventory posting happens in April, a new inventory snapshot will be created for the month of April and the March inventory snapshot, which is open until the inventory posting in April, will be closed. The closed March inventory snapshot has a start time as March 1 (00:00 March 1) and a closing time as 00:00 April 1 which represents the end of March, i.e. 24:00 March 31. The March inventory snapshot is therefore valid from 00:00 March 1 to 00:00 April 1. The open April inventory snapshot has a start time as 00:00 April 1, with no end date at the current instance. Therefore, at any given point in time there will be one open inventory snapshot (i.e. current open inventory snapshot).

Inventory is verified for a past time period at 208 by comparing the difference between two latest consecutive inventory snapshots and the aggregated inventory change confirmations posted in the past time period. The latest consecutive inventory snapshots include the inventory snapshot open for the past time period and an inventory snapshot open for a time period previous and consecutive to the past time period. Consider that the past time period is March. A time period previous to the past time period and consecutive to the past time period is February. The March inventory snapshot covers inventory posting in March, i.e. it is open/valid for the March. Similarly, the February inventory snapshot covers inventory posting in February. The difference between the March inventory snapshot and the February inventory snapshot is then compared with the inventory change confirmations that are posted in the month of March, i.e. from 00:00 March 1 to 00:00 April 1.

The verification procedure is performed for each time period iteratively. For example, assume that the first inventory change confirmation ever posted occurs in a period 'X.' Then all inventory snapshots valid until period X−1 have to be zero. Assuming that all inventory snapshots of a given period Y>=X have been verified successfully, the period 'Y+1' can be verified by comparing the differences between an inventory snapshot that covers the end of period 'Y+1' and an inventory snapshot that covers the end of the period 'Y.' The difference between these two snapshots must be equal to the sum of corresponding inventory change confirmations that have been posted in period Y+1. Therefore, for a past time period, a preceding time period immediately previous to the past time period is already verified.

If the aggregated inventory confirmations are not equal to the difference between the March inventory snapshot and the February inventory, then an error indicator is provided at 210. An alignment posting can then be made to realign the inventory quantity in the inventory management system. Any mismatch can be immediately corrected for a respective time period. Therefore, a posting error in one time period is not transmitted to subsequent time periods.

Figure 3:
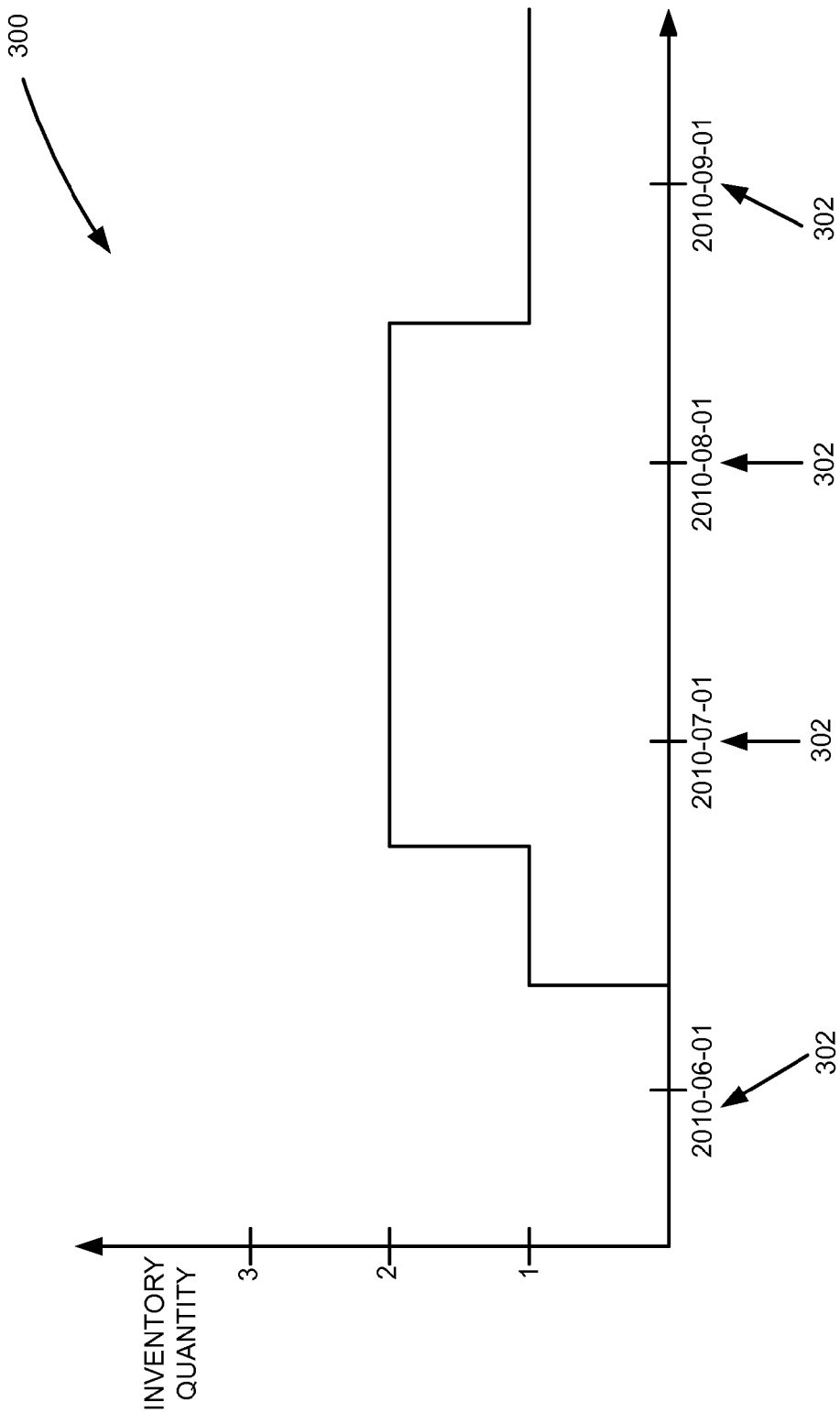
FIG. 3 is a block diagram illustrating the time periods for inventory snapshots, according to one embodiment.

FIG. 3 is an illustration of time periods 300 for inventory snapshots. The time periods 300 are defined by predefined points in time 302 for inventory snapshots. These predefined points in time 302 can be defined in advance or created on the fly for a given period raster. In one embodiment, the predefined points in time 302 are stored in a Business Objects administrative data sub-component of the inventory processing component of SAP® logistics execution system (a product of SAP® AG, Germany). A time period is defined between two predefined points in time 302. In the illustration, the first time period starts from 2010-06-01.

Figure 4:
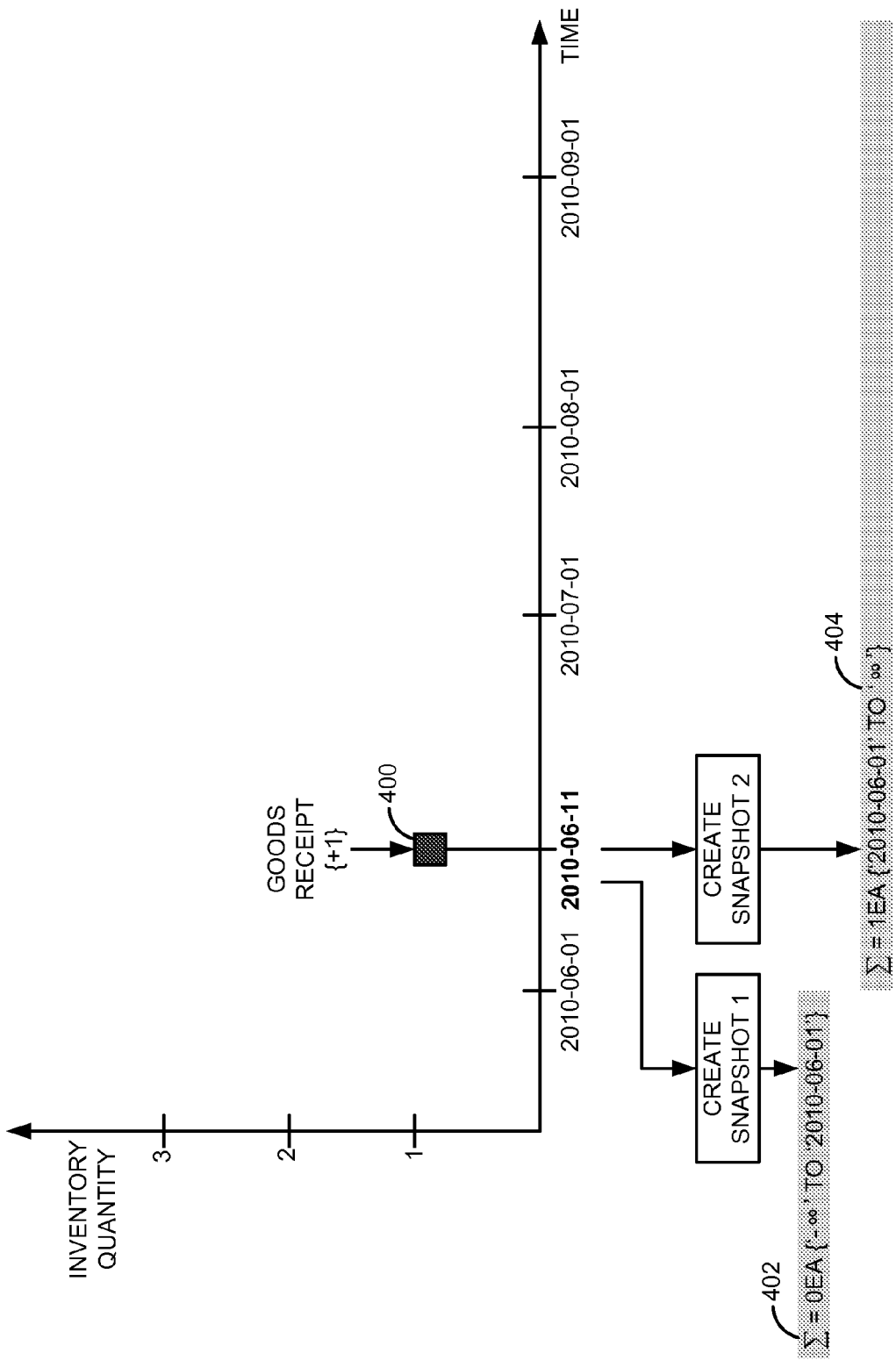
FIG. 4 is a block diagram illustrating the creation of inventory snapshots in a first inventory posting in a first time period, according to one embodiment.

Referring to FIG. 4, consider that a first inventory posting 400 is made on '2010-06-11' that is in a time period between 2010-06-01 and 2010-07-01. The first inventory posting 400 can be, for example, a goods receipt posting with inventory quantity '+1'. In response to the first inventory posting, a closed first inventory snapshot 402 with zero inventory quantity is created. The closed first inventory snapshot 402 is valid for the period from 'minus infinity (−∞)' to '2010-06-01.' The closed first inventory snapshot 402 is called closed because it belongs to a period in the past and cannot be updated by any subsequent inventory change confirmation entered into the system. Following which, a second open inventory snapshot 404 is created using inventory information of the first inventory posting 400. The second open inventory snapshot 404 is now valid for the period from '2010-06-01' to 'infinity (∞)'. The predefined point in time '2010-06-01' is a start date for second open inventory snapshot 404 and a closing time for closed first inventory snapshot 402.

Figure 5:
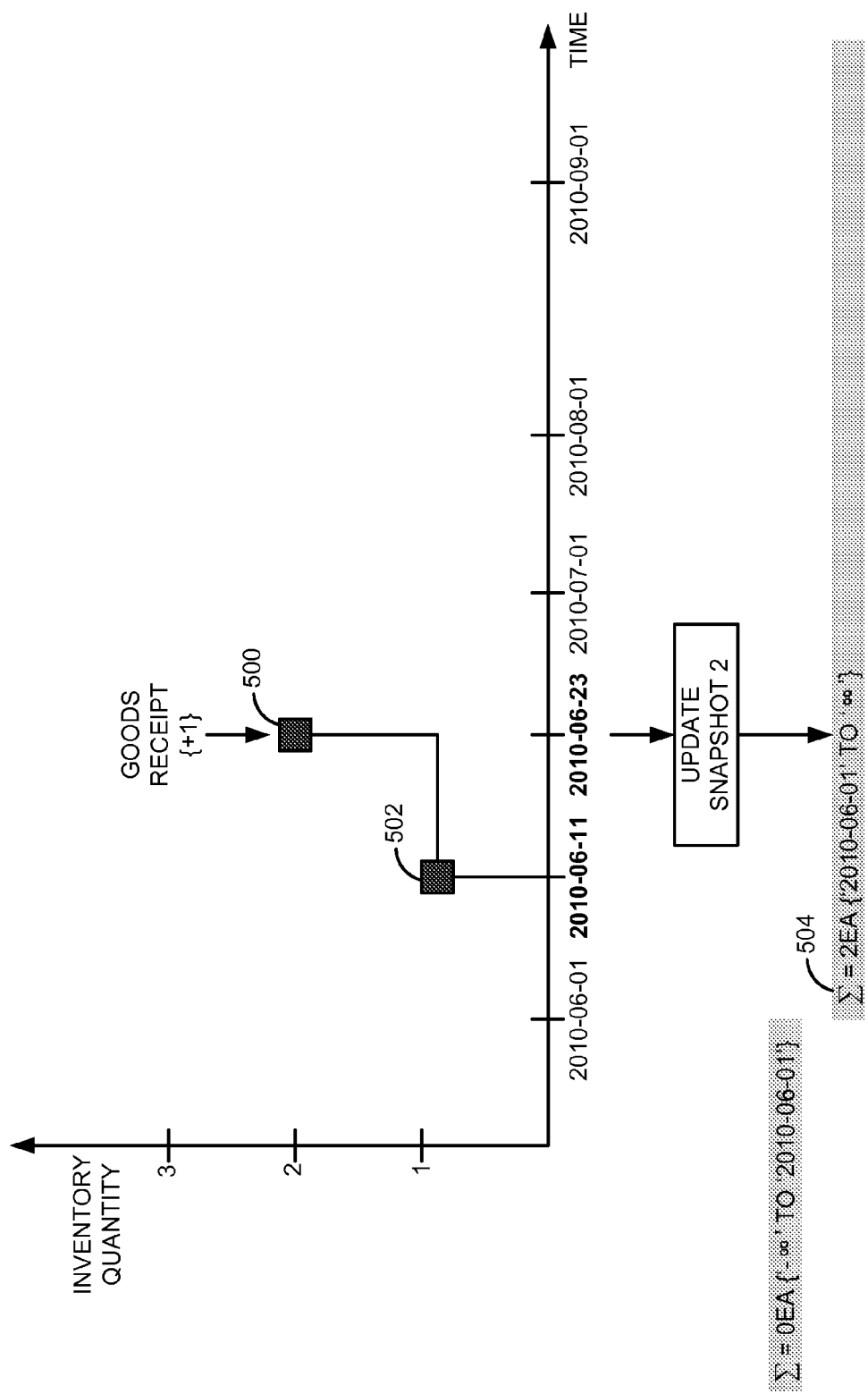
FIG. 5 is a block diagram illustrating the creation of inventory snapshots in a second posting in a time period, according to one embodiment.

Referring to FIG. 5, consider a second goods receipt posting 500 is made on '2010-06-23' with inventory quantity '+1.' Since the second goods receipt posting 500 is made in the same period (i.e. within June) as the first goods receipts posting 502, the inventory quantity in the second open inventory snapshot 504 is updated with quantity '1' from the second goods receipt posting 500. No new inventory snapshot is created. The second open inventory snapshot 504 has an inventory quantity of '2'. The second open inventory snapshot 504 will be updated by all inventory postings that occur in the period of June.

Figure 6:
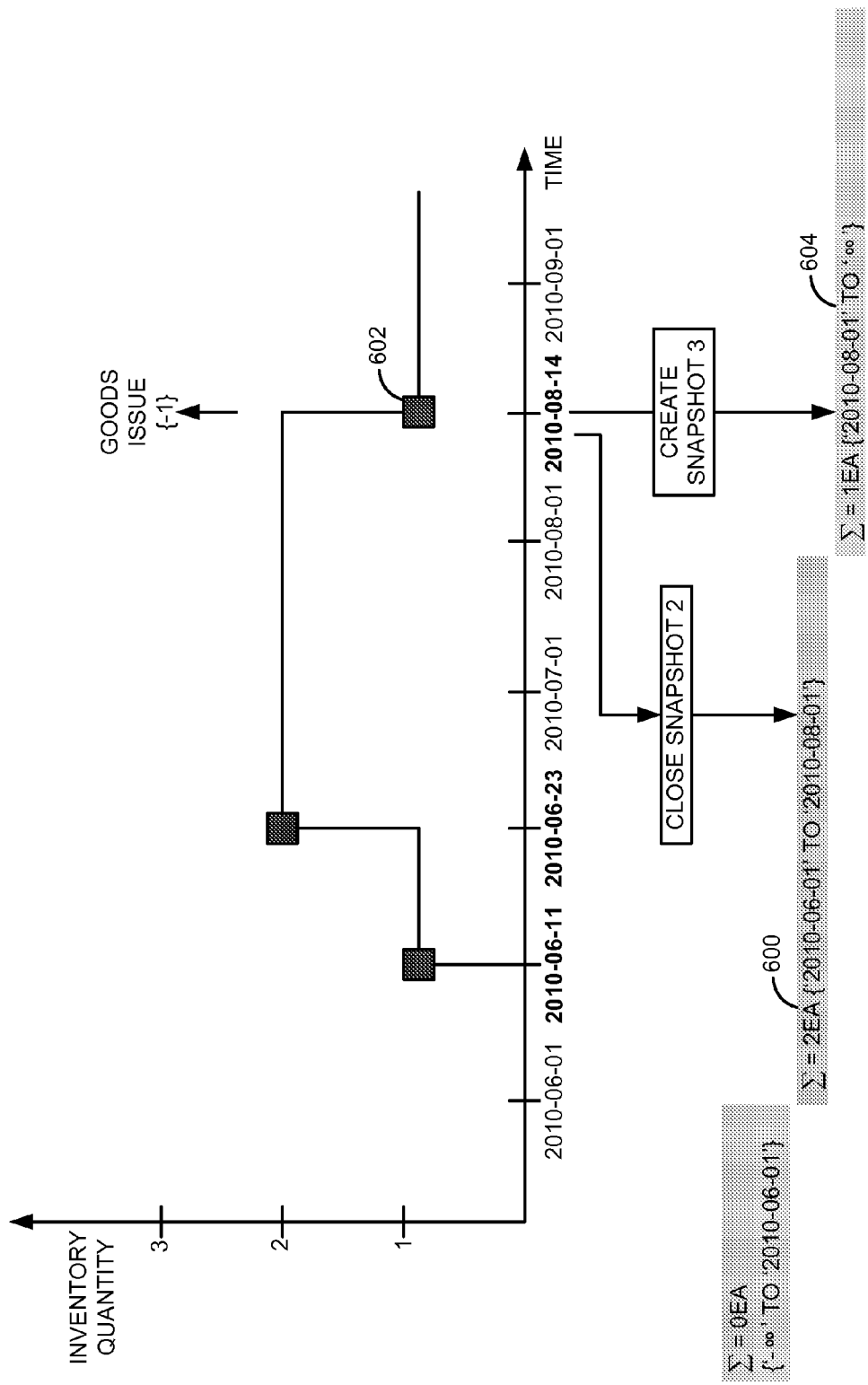
FIG. 6 is block diagram illustrating the creation of inventory snapshots in a subsequent time period, according to one embodiment.

Referring to FIG. 6, the second open inventory snapshot 600 is open until a next inventory posting happens in a time period subsequent to the time period of June. In the example of FIG. 6, no inventory posting occurs in the subsequent time period, i.e. from '2010-07-01' to '2010-08-01'. Therefore, the second inventory snapshot 600 is open for this period. Consider that another inventory posting, for example, a goods issue posting 602 is made on '2010-08-14' with inventory quantity '1'. The goods issue posting 602 is a first inventory posting that occurs in a current time period {'2010-08-01' to '2010-09-01'} that is subsequent to the time period of the former snapshot. The goods issue posting 602 has inventory quantity of '−1' implying that the inventory is reduced by a quantity '1'. A previous open inventory snapshot, i.e. the second inventory snapshot 600, is closed in response to the goods issue posting 602. A current open inventory snapshot 604 is then created with inventory information.

In one embodiment, the inventory quantity in the current open inventory snapshot is an absolute of inventory quantities of the goods issue posting and the second snapshot. The inventory quantity in the goods issue posting is {−1} and the inventory quantity in the second snapshot is {2}. Therefore, the inventory quantity in the current open inventory snapshot 604 is '1' {−1+2=1}. The current open inventory snapshot 604 is valid from '2010-0801' to '∞' until an inventory posting is made in a time period subsequent to the current time period {'2010-08-01' to '2010-09-01'}.

Figure 7:
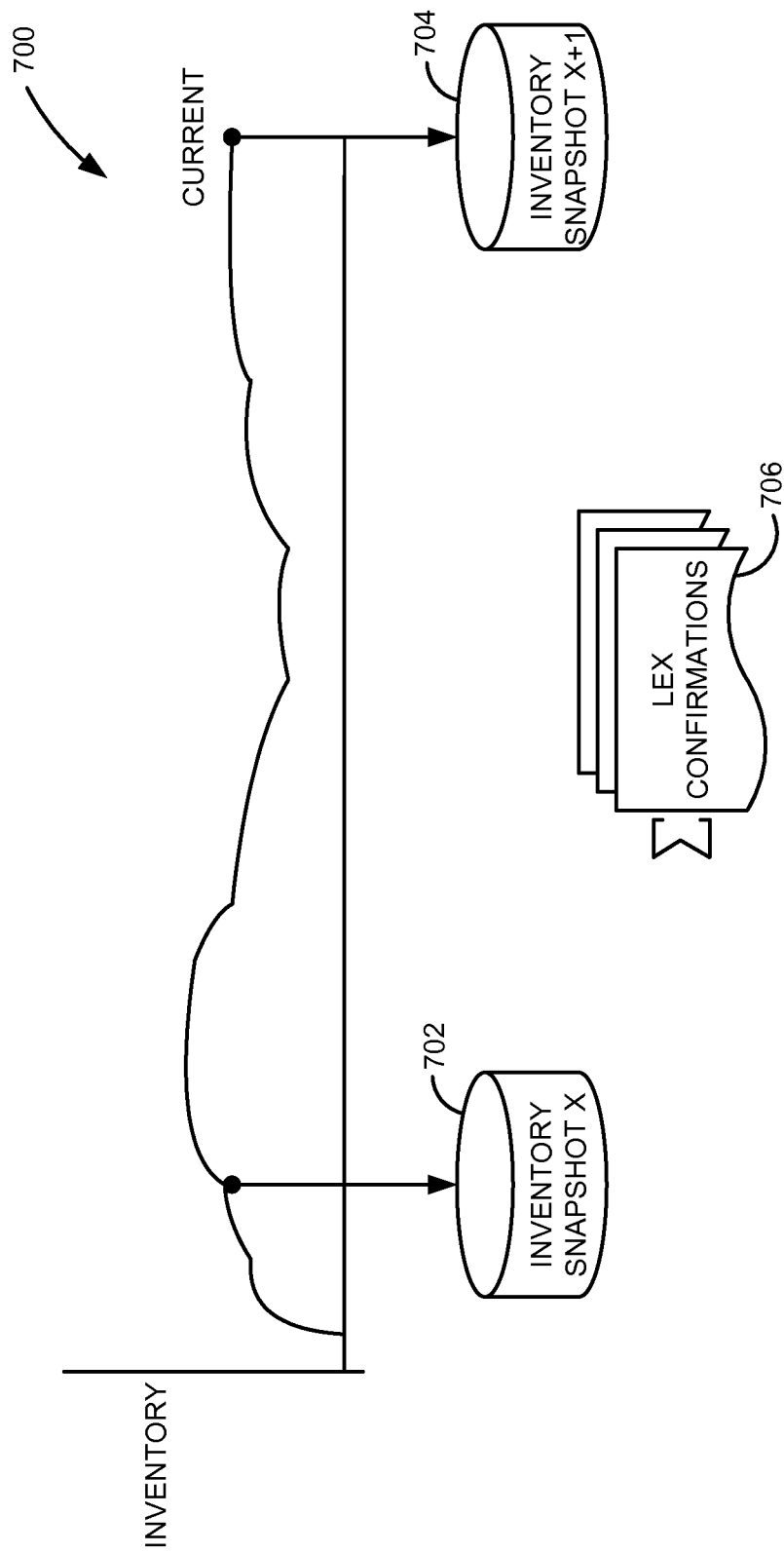
FIG. 7 is a block diagram illustrating inventory verification, according to one embodiment.

FIG. 7 is an exemplary illustration of a procedure of inventory verification 700 using inventory snapshots. Two consecutive latest inventory snapshots are considered to verify the inventory. The inventory snapshot X 702 and the inventory snapshot X+1 704 are two consecutive latest inventory snapshots. A snapshot contains absolute inventory quantity that is valid at the end of the period covered by the snapshot and for all periods subsequent to the period covered by the snapshot. Therefore, the difference between two consecutive snapshots (i.e. first snapshot 'X' and second snapshot 'X+1') is compared with the sum of all inventory change confirmations 706 that occurred during the validity interval (time period) of the second snapshot 'X+1.'

Various embodiments of database design for inventory verification method are explained in reference to FIGS. 8-14. The inventory verification method can be implemented in any inventory management system. In one embodiment, inventory snapshots data can be divided into inventory snapshot header data and inventory snapshot item data. Predefined points in time for inventory snapshots can be stored in inventory snapshot headers. Information about closed and open status of inventory snapshots can also be stored in inventory snapshot headers. The header data can be stored in Business Objects administrative data sub-component of the inventory processing component of SAP® logistics execution system. Inventory snapshot item data stores the content, i.e. inventory information, of inventory snapshots. The inventory information mainly includes inventory item quantity and location information of inventory items. Location information typically includes hierarchical location information. The content of inventory snapshots can be stored in Business Objects inventory sub-component of the inventory processing component of SAP® logistics execution system.

Database tables are created for performing the inventory verification method. As shown in FIG. 8, a database table "/LIME/SN_HEADER" is created for storing inventory snapshot headers. LIME stands for Logistics Inventory Management Engine, an inventory management system of SAP®. Database tables "/LIME/SN_NTREE," "/LIME/SN_NQUAN," and "/LIME/SN_LSQ" are created for storing inventory information of inventory snapshots, as shown FIGS. 9-11 (SN stands for snapshot). The snapshot content tables of FIGS. 9-11 have the same layout as their corresponding regular tables with the exception of having additional fields of TS_PERIOD_START and TS_SNAPSHOT. TS_PERIOD_START stores start date (or time) or opening date of an inventory snapshot and TS_SNAPSHOT stores closing time of the inventory snapshot. The corresponding tables are "/LIME/NTREE," "/LIME/NQUAN," and "/LIME/LSQ," which are used to store regular inventory information.

Figure 12:
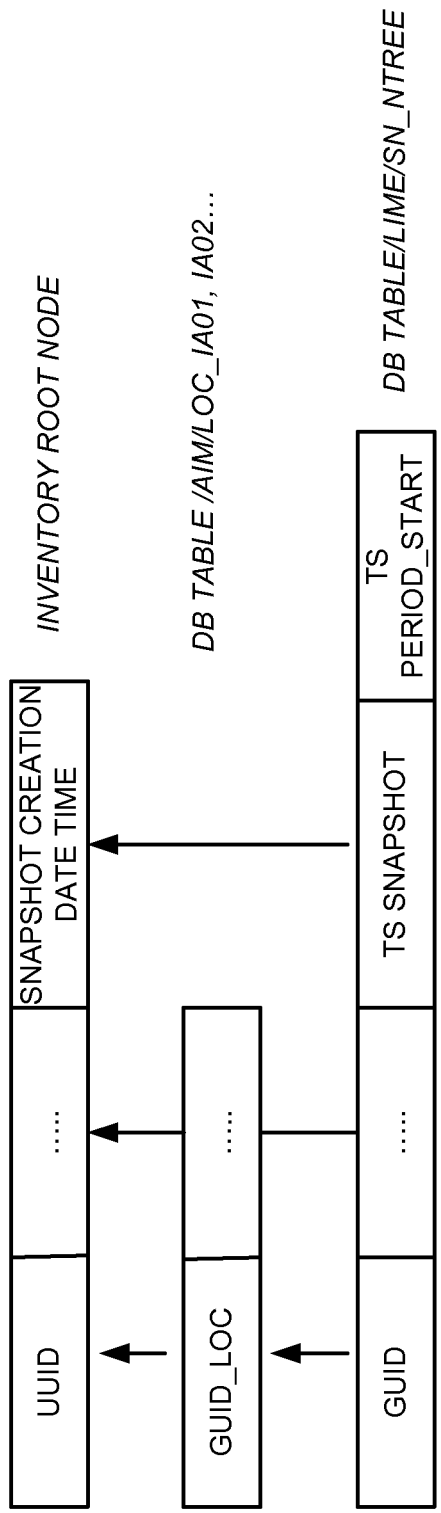
FIG. 12 is a block diagram illustrating a relation between an inventory root node and a database table, according to one embodiment.
Figure 13:
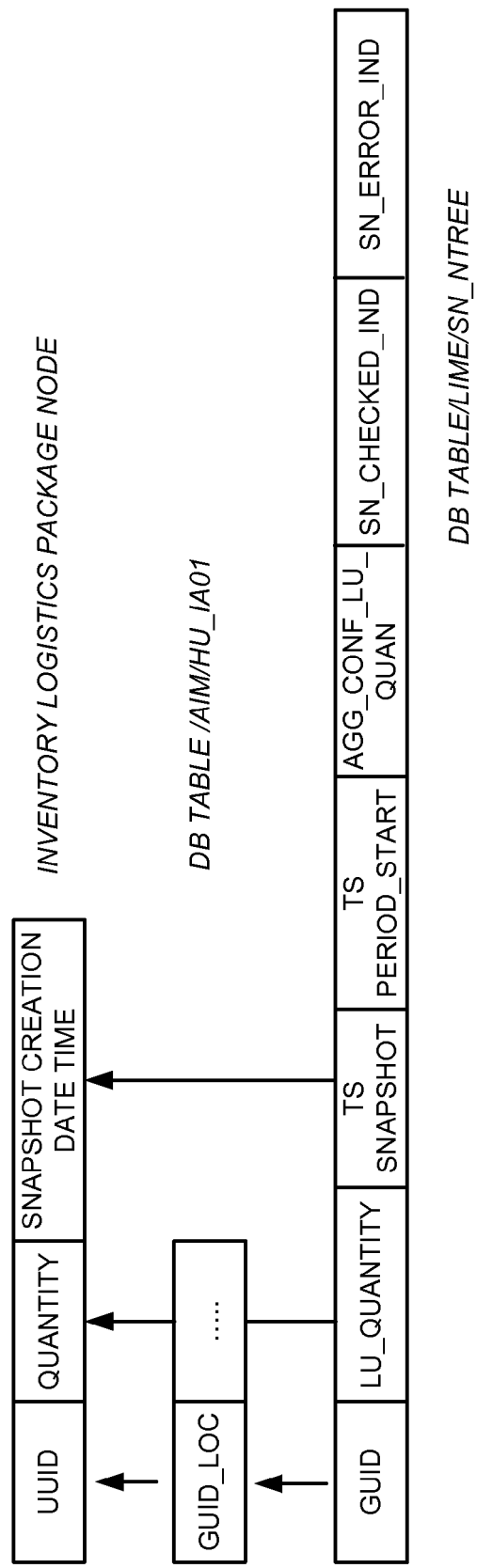
FIG. 13 is a block diagram illustrating a relation between an inventory logistics package node and a database table, according to one embodiment.
Figure 14:
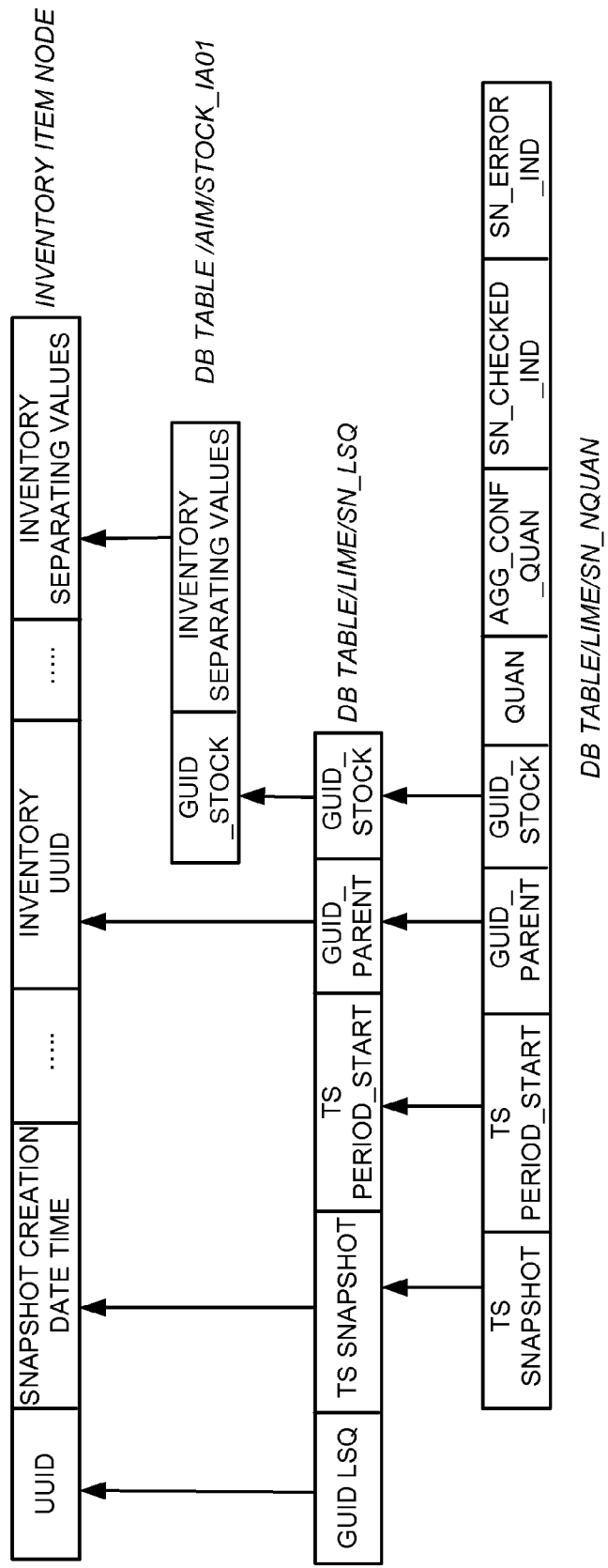
FIG. 14 is a block diagram illustrating a relation between an inventory item node and a database table, according to one embodiment.

In one embodiment, these database tables are mapped to Business Objects inventory nodes of SAP® logistics execution system. An overview of database model and its mapping to the Business Objects inventory nodes are shown if FIGS. 12-14. FIG. 12 shows a mapping of database table "/LIME/SN_NTREE" to an inventory root node of Business Objects inventory. Database table "/LIME/SN_NTREE" is mapped to inventory logistics package node of Business Objects inventory as shown in FIG. 13. Database table "/LIME/SN_NQUAN" is mapped to inventory logistics package node of Business Objects inventory is shown in FIG. 14.

FIG. 15 shows entries that are created in the database tables "/LIME/SN_NQUAN" and "/LIME/SN_LSQ" in response to a first inventory posting in a time period. The first inventory posting is made in June 2009 with an inventory quantity '10.' New entries in "/LIME/SN_NQUAN" table and "/LIME/SN_LSQ" are then created. All fields are copied from "/LIME/NQUAN" table and "/LIME/LSQ." The quantity 10 is entered in the "/LIME/SN_NQUAN" table. TS_PERIOD_START is set to 01.06.2009 as the start date of the inventory snapshot. TS_SNAPSHOT is set to infinity (e.g. 31.12.9999 23:59:00). A new GUID_SN (GUID1) is created and persisted in "/LIME/SN_LSQ" in table for the first inventory snapshot.

Referring to FIG. 16, for a second inventory posting is made in June 2009 with an inventory quantity '10,' the quantity field in the "/LIME/SN_NQUAN" entry is updated. The quantity field now has quantity '20.' Since this second inventory posting is made in the same time period, the "/LIME/SN_LSQ" entry is not changed.

Referring to FIG. 17, if a third inventory posting is made in July 2009 with an inventory quantity '10,' the first inventory snapshot with the start date 01.06.2009 will be closed. The "TS_SNAPSHOT" field in "/LIME/SN_NQUAN" is changed to 01.07.2009 and other fields stay unchanged for the first inventory snapshot. Therefore, the closing time of the first inventory snapshot will be 01.07.2009. A second inventory snapshot is created with start date as 01.07.2009. For the second inventory snapshot, TS_PERIOD_START is set to 01.07.2009 and TS_SNAPSHOT is set to infinity. The new entry gets the new absolute quantity 30, (i.e. 20 from the first inventory snapshot+10 from the third inventory posting). In "/LIME/SN_LSQ," the first inventory snapshot entry is also closed (TS_SNAPSHOT is changed to 01.07.2009) and a new entry is created for the second inventory snapshot with new GUID_SN (GUID2).

Any changes to location or logistics unit are handled similar to the procedure described above except that the "/LIME/SN_NTREE" table is used. If a new location or logistics area is created, a new entry in "/LIME/SN_NTREE" table is created. All fields are copied from "/LIME/NTREE" table to "/LIME/SN_NTREE" table. Analogously to the "/LIME/SN_NQUAN" entries as shown in FIG. 15, the start date is set to the start date of the current period and an end date is set to infinity (31.12.9999). The same procedure can also be applied for new logistic unit (LU) entries.

FIG. 18 shows an entry created in a database table for verifying the inventory. In the example of FIG. 18, verification is performed for the past period 01.06.2009-01.07.2009. The difference between an inventory snapshot that is valid for the past time period and an inventory snapshot (not shown in table) that is valid for a previous time period previous to the past time period is calculated. The inventory snapshot valid for the past time period has an inventory quantity 20 and the previous inventory snapshot is assumed to have zero quantity. The difference is compared with aggregated inventory change confirmations posted in the past time period.

In one embodiment, the inventory quantity in the first inventory snapshot is compared with an aggregate of inventory confirmation quantities in the period 01.06.2009-01.07.2009. Aggregated confirmation quantities are calculated as a sum of aggregated inventory change confirmations for the period 01.06.2009-01.07.2009 and inventory quantity for a period ending on 00:00 01.06.2009. This procedure of verifying inventory using "aggregated confirmation quantities" is equivalent to the procedure of verifying inventory by comparing the difference of snapshots with the aggregated inventory change confirmations. If there is a mismatch, an error indicator is set. After verification, a checked entry is made for the first inventory snapshot. In this case the inventory quantity {20} in the first inventory snapshot is equal to an aggregate of inventory confirmation quantities {AGG_CONF_QUAN=20} in the period 01.06.2009-01.07.2009. Therefore, error indicator is not checked.

Referring to FIG. 19, for the period 01.07.2009-01.08.2009, the inventory quantity {30} in the second inventory snapshot does not match an aggregate of inventory confirmation quantities {AGG_CONF_QUAN=32} in the period 01.07.2009-01.08.2009. An error indicator is then set for the second inventory snapshot. A responsible party can be automatically notified of the error indicator.

FIG. 20 shows an entry created in a database table after correcting a mismatch. To correct a mismatch between inventory quantity in an inventory snapshot and aggregate inventory confirmation quantities, an alignment posting is made. The inventory quantity should be aligned to the inventory change confirmation quantity because the confirmation quantity may have already been sent to inventory planning and financial accounting. An alignment posting with inventory quantity "2" with a posting date in the period 01.07.2009-01.08.2009 is made.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

FIG. 21 is a block diagram of an exemplary computer system 2100. The computer system 2100 includes a processor 2105 that executes software instructions or code stored on a computer readable storage medium 2155 to perform the above-illustrated methods of the invention. The computer system 2100 includes a media reader 2140 to read the instructions from the computer readable storage medium 2155 and store the instructions in storage 2110 or in random access memory (RAM) 2115. The storage 2110 provides a large space for keeping static data where at least some instructions could be stored for later execution. The stored instructions may be further compiled to generate other representations of the instructions and dynamically stored in the RAM 2115. The processor 2105 reads instructions from the RAM 2115 and performs actions as instructed. According to one embodiment of the invention, the computer system 2100 further includes an output device 2125 (e.g., a display) to provide at least some of the results of the execution as output including, but not limited to, visual information to users and an input device 2130 to provide a user or another device with means for entering data and/or otherwise interact with the computer system 2100. Each of these output devices 2125 and input devices 2130 could be joined by one or more additional peripherals to further expand the capabilities of the computer system 2100. A network communicator 2135 may be provided to connect the computer system 2100 to a network 2150 and in turn to other devices connected to the network 2150 including other clients, servers, data stores, and interfaces, for instance. The modules of the computer system 2100 are interconnected via a bus 2145. Computer system 2100 includes a data source interface 2120 to access data source 2160. The data source 2160 can be accessed via one or more abstraction layers implemented in hardware or software. For example, the data source 2160 may be accessed by network 2150. In some embodiments the data source 2160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   in response to a first inventory posting in a current time period,
      create a current open inventory snapshot with inventory quantity, when there is an open inventory snapshot created in a time period previous to the current period, close the previously created open inventory snapshot;

verify inventory for a past time period by comparing a difference between an inventory snapshot that is valid for the past time period and an inventory snapshot that is valid for a time period previous to the past time period with aggregated inventory change confirmations posted in the past time period; and provide an error indicator when there is a mismatch between the difference and the aggregated inventory change confirmations.

2. The article of manufacture of claim 1, further comprising instructions which when executed by the computer further causes the computer to:

assign a start time of the current time period as a start time for the current open inventory snapshot; and assign the start time of the current time period as a closing time for the previously open inventory snapshot when closing the previously open inventory snapshot.

3. The article of manufacture of claim 2, wherein the instructions to verify inventory comprises instructions to:

iteratively verify the inventory for each time period.

4. The article of manufacture of claim 1, further comprising instructions which when executed by the computer further causes the computer to:

in response to inventory postings in the current period subsequent to the first inventory posting in the current time period, update the inventory quantity of the current open inventory snapshot.

5. The article of manufacture of claim 1, further comprising instructions which when executed by the computer further causes the computer to:

in response to a first inventory posting in a first time period,
create a closed first inventory snapshot with zero quantity; and
create a second inventory snapshot with inventory quantity from the first inventory posting in the first time period.

6. The article of manufacture of claim 1, wherein time periods for creating inventory snapshots are predefined.

7. The article of manufacture of claim 1, wherein the inventory quantity is a copy of inventory.

8. A computer-implemented method for inventory verification, the method comprising:

in response to a first inventory posting in a current time period,
a computer creating a current open inventory snapshot with inventory quantity,
when there is an open inventory snapshot created in a time period previous to the current period, the computer closing the previously created open inventory snapshot;
the computer verifying inventory for a past time period by comparing a difference between an inventory snapshot that is valid for the past time period and an inventory snapshot that is valid for a time period previous to the past time period with aggregated inventory change confirmations posted in the past time period; and
the computer providing an error indicator when there is a mismatch between the difference and the aggregated inventory change confirmations.

9. The method of claim 8, further comprising:
assigning a start time of the current time period as a start time for the current open inventory snapshot; and
assigning the start time of the current time period as a closing time for the previously open inventory snapshot when closing the previously open inventory snapshot.

10. The method of claim 9, wherein verifying inventory, comprises:
iteratively verifying the inventory for each time period.

11. The method of claim 8, further comprising:
in response to inventory postings in the current period subsequent to the first inventory posting in the current time period, updating the inventory quantity of the current open inventory snapshot.

12. The method of claim 8, further comprising:
in response to a first inventory posting in a first time period,
creating a closed first inventory snapshot with zero quantity; and
creating a second inventory snapshot with inventory quantity from the first inventory posting in the first time period.

13. The method of claim 8, wherein time periods for creating inventory snapshots are predefined.

14. The method of claim 8, wherein the inventory quantity is a copy of inventory.

15. A computer system for inventory verification, comprising:
a computer memory to store program code; and
a processor to execute the program code to:
in response to a first inventory posting in a current time period,
create a current open inventory snapshot with inventory quantity,
when there is an open inventory snapshot created in a time period previous to the current period, close the previously created open inventory snapshot;
verify inventory for a past time period by comparing a difference between an inventory snapshot that is valid for the past time period and an inventory snapshot that is valid for a time period previous to the past time period with aggregated inventory change confirmations posted in the past time period; and
provide an error indicator when there is a mismatch between the difference and the aggregated inventory change confirmations.

16. The system of claim 15, wherein the processor further executes the program code to:
assign a start time of the current time period as a start time for the current open inventory snapshot; and
assign the start time of the current time period as a closing time for the previously open inventory snapshot when closing the previously open inventory snapshot.

17. The system of claim 16, wherein the program code to verify inventory further comprises program code to:
iteratively verify the inventory for each time period.

18. The system of claim 15, wherein the processor further executes the program code to:
in response to inventory postings in the current period subsequent to the first inventory posting in the current time period, update the inventory quantity of the current open inventory snapshot.

19. The system of claim 15, wherein the processor further executes the program code to:
in response to a first inventory posting in a first time period,
create a closed first inventory snapshot with zero quantity; and
create a second inventory snapshot with inventory quantity from the first inventory posting in the first time period.

20. The system of claim 15, wherein time periods for creating inventory snapshots are predefined.

21. The system of claim 15, wherein the inventory quantity is a copy of inventory.

* * * * *